Jan. 18, 1955            J. C. O'BRIEN                      2,699,834
SPEED AND DISTANCE RESPONSIVE SAFETY DEVICE FOR VEHICLES
Filed July 5, 1949                                          4 Sheets-Sheet 1
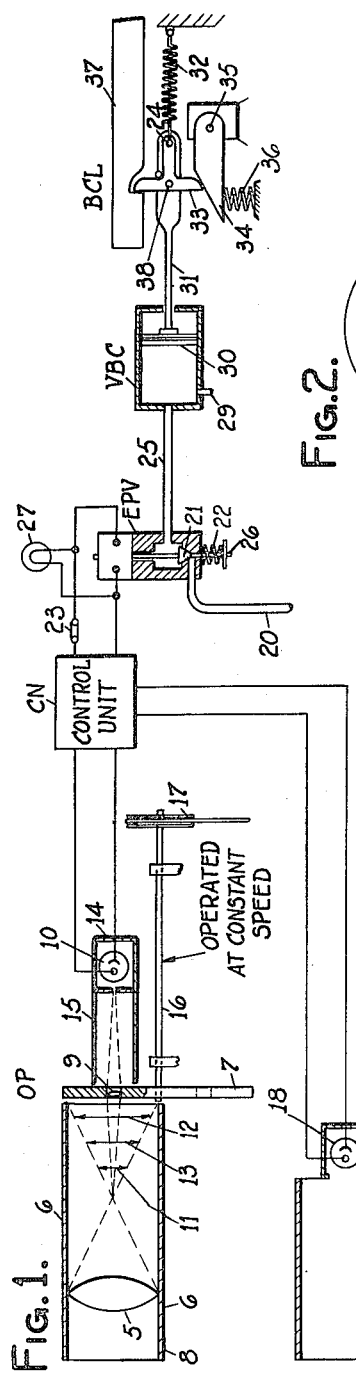
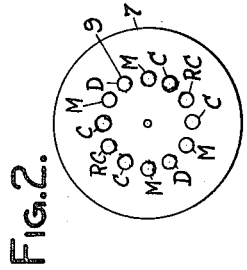
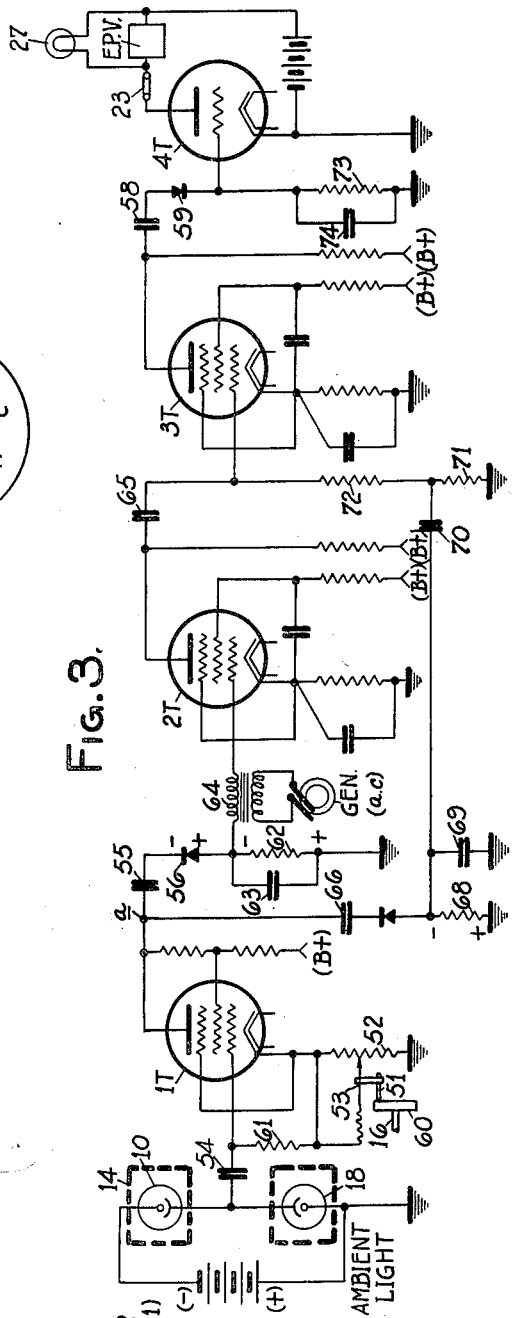
INVENTOR.
J. C. O'BRIEN
BY Forest B. Hitchcock
his ATTORNEY Jan. 18, 1955  J. C. O'BRIEN  2,699,834
SPEED AND DISTANCE RESPONSIVE SAFETY DEVICE FOR VEHICLES
Filed July 5, 1949  4 Sheets-Sheet 2

(SAME AS FIG.3)
(FROM POINT a)

DIAGRAM FOR FORM OF FIG.4.

Inventor
J. C. O'BRIEN
By Forest B. Hitchcock
his Attorney

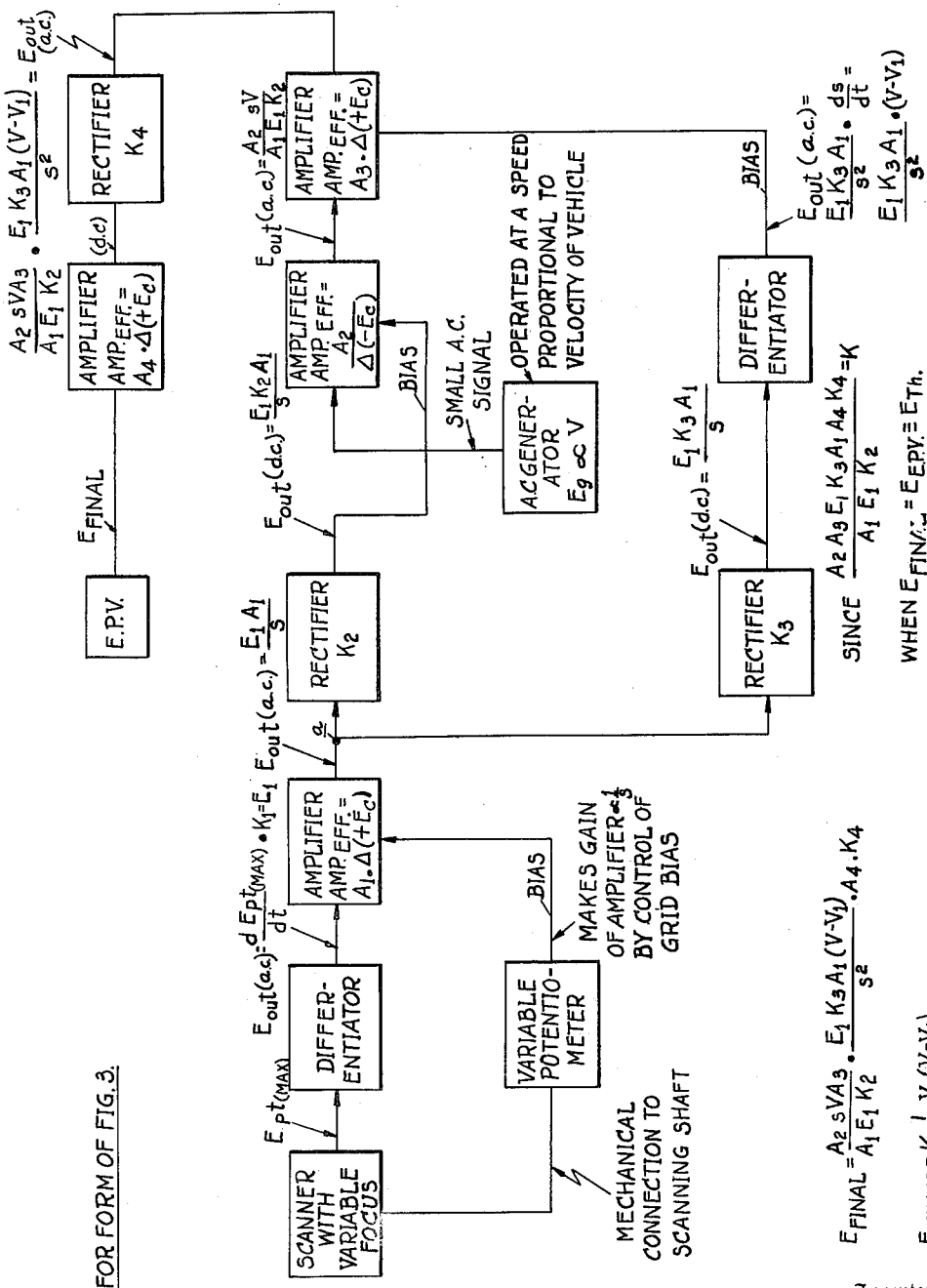

Jan. 18, 1955  J. C. O'BRIEN  2,699,834
SPEED AND DISTANCE RESPONSIVE SAFETY DEVICE FOR VEHICLES
Filed July 5, 1949  4 Sheets-Sheet 4

RESISTORS SET AT PROGRESSIVELY
DECREASING RESISTANCES
BEGINNING WITH RESISTOR 1a
FOR INCREASING RANGE OF FOCUS

DIAGRAM FOR FORM OF FIG. 6.

Inventor
J. C. O'BRIEN
By Forest B. Hitchcock
his Attorney

United States Patent Office 2,699,834
Patented Jan. 18, 1955

1

2,699,834

SPEED AND DISTANCE RESPONSIVE SAFETY DEVICE FOR VEHICLES

John C. O'Brien, Rochester, N. Y.

Application July 5, 1949, Serial No. 103,131

5 Claims. (Cl. 180—82.1)

This invention relates to distance and speed responsive devices, and more particularly pertains to such a device employing reflected light and suitable photoelectric means for detecting it in connection with the control of a moving vehicle with respect to fixed or moving objects.

It is often desirable to determine the distance between two objects and also the speed at which the objects are approaching each other. This can be done through the use of various media such as electric pulses, infrared rays, white light, and by supersonic sound or the like. However, in accordance with the present invention it is proposed to employ white light as the particular medium to act upon suitable photoelectric means which is so controlled and correlated with the focus of the rays of light as to interpret the light rays received with respect to the speed of the object or moving vehicle upon which the organization is located, as well as in accordance with the distance of such vehicle from other objects.

Such an organization responsive to speed and distance may be employed to control the movements of vehicles of various types; but, for convenience in the disclosure of the particular embodiment of the present invention, an automobile is selected as the particular type of vehicle to which the present invention is applied. Many times accidents occur in connection with automobiles due to human failings such as reaction time, wandering attention, lack of judgment, paralysis of fear or surprise, and drowsiness. The present invention proposes to supplement the human control of an automobile with means which will provide protection against such human failings, but in such a manner that adequate human action will fully restore the control of the vehicle to the operator.

Generally speaking, and without attempting to define the scope or utility of the present invention, it may be said that the embodiment of the invention contemplates the use of a photoelectric eye which, with suitable electronic control means, will be able to effect the application of the brakes of the vehicle if the vehicle is approaching an object at an unsafe speed or is actually too close to the object for the speed at which it is then traveling. However, there are occasions when absolute brake applications by an automatic device are unsafe. For this reason, it is proposed that the automatic control may be eliminated in those situations as soon as an operator proceeds to manually apply the brakes, or actuate a suitable switch. In some other situations, it is proposed that a change of course will also eliminate the automatic brake application. To provide suitable means for this condition, it is proposed that the automatic control of the present invention may be rendered ineffective when the steering wheel of the vehicle is turned from the normal "straight ahead" position more than a predetermined number of degrees.

It is further proposed in connection with the present invention that the control means will act to perceive objects in the path of the vehicle by the reflection of wave energy in its most practical form, such as the use of visible light. Thus, the present invention employs the more practical forms of ranging technique by using optical focus. Such an arrangement also has the advantage that it requires no special transmitter or selective tuning equipment as would be required if radio pulse techniques were employed.

It is proposed that the detecting portion of the organization shall convey the following information to the control mechanism:

1. Presence of an object in the path of the vehicle.

2

2. Distance between the vehicle and the object.
3. Relative speed with which the vehicle is approaching the object.

The control mechanism then acts in response to such information to cause the application of brakes to the vehicle in proportion to its relative speed of approach to the object when such speed is unsafe for the existing distance of separation between the two. Also, the mechanism governs the degree of application of the brakes in proportion to the absolute speed of the vehicle.

Thus, one object of the present invention may be said to be the provision of a simple yet effective distance and speed detecting device coordinated to give both a distinctive indication and a control when their relative values reach predetermined limits.

Another object of the present invention is to provide electronic control means which will interpret the information above noted as detected by a photoelectric organization.

A still further object of the present invention resides in the application of the distance and speed detecting apparatus in a manner to safely and automatically control the application of brakes to a moving vehicle.

Other objects, purposes and characteristic features will in part be pointed out and in part be obvious as the description of the invention progresses.

In describing the invention in detail, reference will be made to the accompanying drawings, in which like reference characters are used for like parts throughout the several views and in which:

Fig. 1 is a diagrammatic illustration of the different parts of the organization providing the automatic control of brakes on a moving vehicle governed in accordance with the speed of the vehicle and the distance that it is from another object in accordance with the present invention;

Fig. 2 is a front view of a scanning disc shown in section in Fig. 1;

Fig. 3 illustrates in a diagrammatic and conventional manner the circuit apparatus employed to effect the proper controls, which apparatus is conventionally indicated in Fig. 1 by a rectangle bearing the legend "Control unit";

Figure 4:
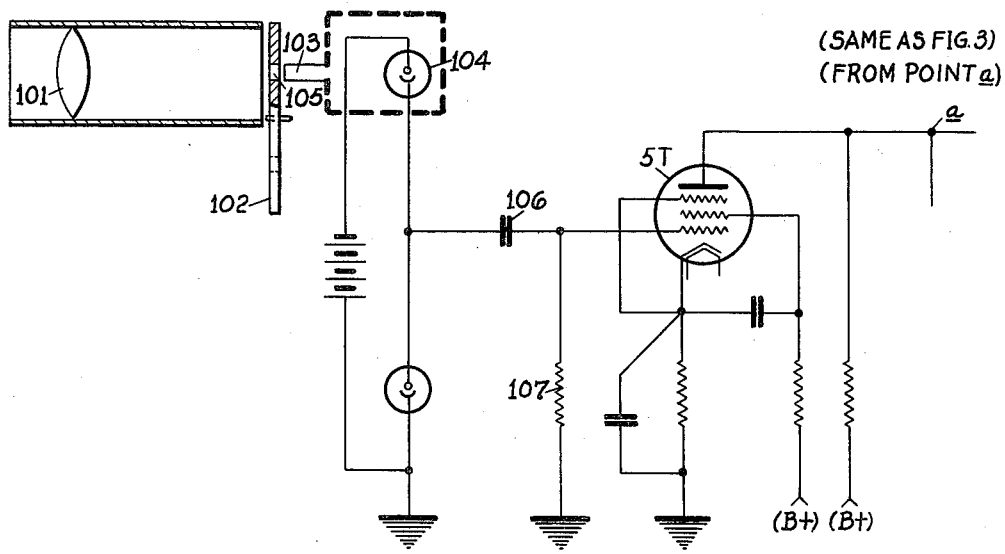
Fig. 4 illustrates in a diagrammatic and conventional manner a modified form of circuit organization employed to effect the proper control contemplated in accordance with the present invention, but which is particularly distinguished from Fig. 3 by the manner in which the scanning is effected by a lens focused for the shortest feasible distance.
Figure 8:
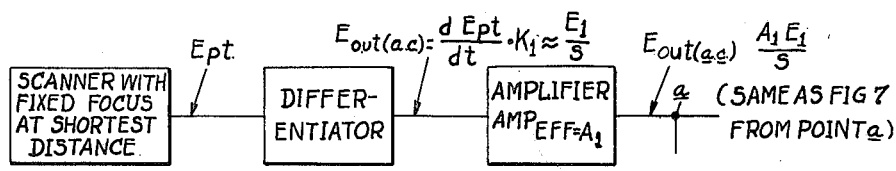
Figure 6:
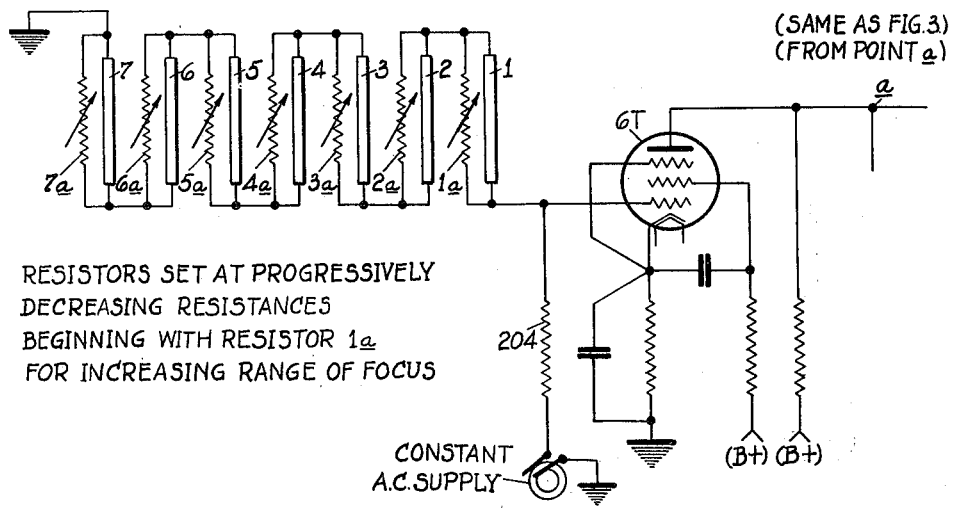
Figure 9:
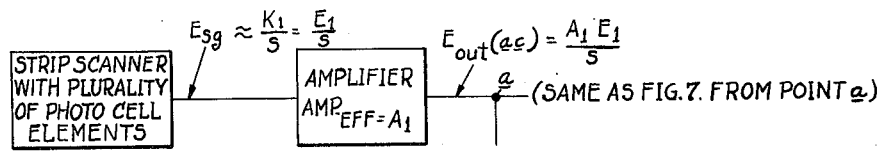

Fig. 6 illustrates in a diagrammatic and conventional manner another modified circuit organization employed to effect the proper controls contemplated by the present invention, and particularly distinguishes from Figs. 3 and 4 in the provision of a light sensitive device which gives a concurrent scanning or pick up control for all distances selected; and Figs. 7, 8, and 9 are block diagrams respectively illustrating the functional relationships of the several forms of control shown in Figs. 3, 4, and 6.

*Structural organization*

With reference to Fig. 1, it will be noted that the complete control organization comprises several units including the optical unit OP, the control unit CN, the electropneumatic valve EPV, the vacuum brake cylinder VBC, and the brake connecting link BCL.

The optical unit OP includes a lens 5 located within a hood 6 which is located on one radius of a scanning disc 7. A rectangular-shaped portion 8 is located at the left end of the hood 6 in such a position as to limit the field comprehended by the objective lens 5. The scanning disc 7 is shown in Fig. 2 as having a plurality of small scanning lenses which are so spaced around the scanning disc 7 that as one scanning lens is leaving the field comprehended by the right hand end of the hood 6, another scanning lens is entering it for reasons later to be described. Each scanning lens 9 is located in a suitable aperture in the scanning disc 7 and has a selected focal length.

It may be noted here that the lens 5 focuses an image of a distant object at the plane indicated by arrow 11; whereas, a relatively close object is focused at the plane 12, while objects at points intermediate to those extremes will of course fall in some intermediate plane, one of which has been indicated by the arrow 13.

Each scanning lens 9 is arranged to refocus on the plane of the aperture of the phototube, a particular image provided by the objective lens 5 corresponding to an actual object at a particular distance ahead of the vehicle.

The scanning lenses 9 are given different focal lengths so that each different position of the scanning disc provides a lens focused upon the particular image corresponding to the distance represented by it upon the plane of the phototube 10. The movement of the scanning disc causes each refocused image to move past the aperture of the photoelectric tube which thus effectively scans point-by-point a substantially horizontal line across the image. In this way, a plurality of distances ahead of the vehicle are checked to determine whether or not an object is present at any one of such distances.

In order that the images focused on the photoelectric tube 10 may be less abrupt in changing from one to another, the focal lengths of the lenses 9 are preferably arranged on the face of the disc 9 as diagrammatically illustrated in Fig. 2. For example, their focal lengths may be for distant, medium, close and real-close in turn as designated by the letters D, M, C and RC respectively, and then arranged in reverse order. Thus, the scanning distance provides that a plurality of different distances may be scanned to determine whether or not there is an object in focus at the corresponding distance and in a sequence to permit a minimum change in the distance focused by the successive steps. It may be noted here that the objective lens 5 and each of the scanning lenses 9 may be made from any suitable material, such as glass, Plexiglas or molded Lucite, both of which are methacrylic products, or the like.

The photoelectric cell 10 is mounted within suitable enclosures 14 in such a manner that it may be moved horizontally within a tubular light enclosing member 15 so that it may be readily adjusted to the proper position for placing the aperture of the photoelectric tube at the focal plane of the various lenses 9.

The scanning disc 7 is mounted upon a shaft 16 suitably supported, and which shaft is driven at a constant speed such as through a belt drive including pulley 17. In addition, this same shaft 16 includes the balanced crank arm 60 indicated fragmentarily in Fig. 3 for reasons later explained.

The control unit CN of Fig. 1 includes a number of electronic tubes, such as tubes 1T, 2T, 3T and 4T, illustrated in Fig. 3. The electronic control unit receives an input from the photoelectric tube 10 indicated as being within its enclosure 14 by the dotted rectangle and also from another photoelectric tube 18 which is within a suitable enclosure with an opening directed in the same general direction as the objective lens 5 so as to be affected by the ambient light for reasons later explained.

The tubes 1T, 2T, 3T and 4T have been shown as pentodes in Fig. 3. These various tubes are indicated as being of the heater type and no specific control has been shown since the provision of energy for heaters is conventional and well known in the art. A suitable plate supply has been designated by the symbols (B+), it being understood that its negative terminal is connected to ground.

In Fig. 3 a generator GEN is provided for the purpose of supplying a relatively small input voltage to the tube 2T which voltage is proportional to the speed of the vehicle. It is assumed that any suitable driving mechanism may be employed for this generator connecting it to the drive of the vehicle.

The output of the electronic control unit CN is supplied through contact 23 to the energizing windings of a solenoid type electro-pneumatic valve EPV indicated by a rectangle in Fig. 3 and shown in partial cross-section in Fig. 1. The pneumatic input to the valve EPV is provided by a source of vacuum attached to the tube 20 which is normally cut off from the valve enclosure by the member 21 being biased to the lower valve seat by spring 22. The internal enclosure within the valve EPV is connected to the vacuum brake cylinder through tube 25 so that when the electro-pneumatic valve EPV is energized unseating the valve member 21, vacuum is supplied to the vacuum brake cylinder through tube 25. However, the rate of the transmission of the vacuum is dependent upon the degree to which the valve member 21 is unseated and this is determined by the degree of energization of the actuating windings of the electro-pneumatic valve EPV. It should be noted here that the initial energization of the electro-pneumatic valve EPV moves the plunger 26 upwardly taking the valve member 21 with it. An indicator lamp 27 is in multiple with the valve EPV.

In connection with the vacuum brake cylinder VBC, it should be noted that it has an opening 29 which allows the entrance of air. This makes it possible to control the piston 30 in accordance with the rate of vacuum supplied through the valve EPV rather than in accordance with an absolute operation. In other words, the degree of energization of the electro-pneumatic valve EPV determines the rate at which a vacuum is supplied and this vacuum has an effect upon the piston 30 and connecting piston rod 31 dependent upon the difference between such rate and the rate of flow through the inlet 29. It should be understood that EPV and VBC could be replaced by a solenoid for acting directly on connecting rod 31 dependent upon the degree of energization furnished from control unit CN, if desired.

The vacuum brake cylinder encloses a piston 30 which has a connecting piston rod 31 biased by spring 32 to a right hand position in which a latching dog 33 pivoted at point 24, is impelled upwardly by the cam dog 34 pivoted at 35. This cam dog 34 is held in its normal position by a spring 36. A lever 37 connects to the manual brake applying means, such as a foot pedal, and is normally biased to the right hand position shown; but when the brakes are manually applied, this lever is actuated to the left to the degree required for the desired brake application. When the manual application of brakes is effected by the movement of the lever 37 to the left, it is apparent that the latching dog 33 is caused to move downwardly and compress the spring 36 by reason of pressure against the cam dog 34 without in any way interfering with the manual actuation of the lever 37.

On the other hand, when a vacuum is produced in the vacuum brake cylinder and the piston 30 is impelled to the left, the piston rod 31 pulls the latching dog 33 to the left bringing with it the brake lever 37 and automatically applying the brakes to a degree in accordance with the position to which the piston 30 is actuated, which is of course dependent upon the degree to which the electro-pneumatic valve EPV is energized. If, when such automatic application occurs, the manual act is performed to move lever 37 to a slight degree farther than the automatic application requires, then the dog 33 is moved downwardly out of a latching position in which it remains until the piston rod 31 is restored to its normal position by spring 32 when the vacuum pressure is removed from the vacuum brake cylinder VBC. This is because of detent 38 which is adapted to hold the latching dog 33 in a lower position whenever it is actuated to that position. If the vacuum is removed while the manual application is still taking place, then the piston rod 31 moves to the right due to spring 32 and the latch 33 being held in a depressed position by lever 37 merely causes the cam dog 34 to compress the spring 36; but if the manual lever 37 has previously been restored before the vacuum is removed, then as soon as piston rod 31 assumes its normal position, then the latch 33 is opposite the recess in the lever 37 so that the cam dog 34 and its biasing spring 36 merely cause it to snap up into an engaging position ready for the next automatic brake application.

As above mentioned, the crank wheel 60 is driven at a constant speed in synchronism with the scanning disc and this causes the potentiometer 52 to supply a variable voltage through movable arm 53 for biasing the amplifier tube 1T. This compensates for the shift from one focused distance to another and causes the output of tube 1T to be proportional to the proximity of an object which may be within the focus of one of the different distances at which objects may be focused by the different lenses 9. It can thus be seen that the crank arm 60 should be driven by the same shaft as the scanning disc 7.

Before considering the operation and general functions of the control unit illustrated in Fig. 3, it is believed to be expedient to first consider the theory upon which the present organization is predicated.

*Theory of safe approach*

As previously stated, the present organization is for the purpose of determining the distance between two moving vehicles and the speed at which such vehicles are approaching each other. When a first vehicle is approaching a second vehicle both traveling in the same direction, and said first vehicle traveling with a given initial velocity V, the distance between it and the second vehicle may be represented by a given distance $(s)$. Also, it may be assumed that the first vehicle has a mass $(m)$ and is provided with apparatus to provide an available braking force $(f)$. The second vehicle may have a velocity of its own and this velocity may be in the same direction or in an opposing direction and may be of any value designated $(V_1)$. For convenience it is assumed that the second vehicle is traveling in the same direction as the first vehicle, and at less than a safe stopping distance of the first vehicle. The first vehicle is assumed to have a normal stopping distance $(s_1)$ which is of a value depending on its velocity and other factors with relationships as follows:

(1) $$fs_1 = \frac{mV^2}{2}$$

Therefore, $$s_1 = \frac{mV^2}{2f}$$

This occurs in a time designated $(t)$ where:

(2) $$ft \approx \frac{mV}{2}$$

Therefore, $$t \approx \frac{mV}{2f}$$

In this time $(t)$, the vehicle number two moves a distance $(s_2)$ at a velocity $(V_1)$.

(3) $$s_2 = tV_1$$

Substituting Equation 2 in Equation 3 for $(t)$ (4) $$s_2 \approx \frac{mVV_1}{2f}$$

The initial distance $(s)$ between vehicle one and vehicle two is represented by the equation:

(5) $$s = s_1 - s_2$$

Substituting in Equation 5 from the Equations 3 and 4, we have the following equation:

(6) $$s \approx \frac{mV^2}{2f} - \frac{mVV_1}{2f}$$

Reducing this Equation 6 gives us the following equation representing an unsafe condition requiring a brake application:

(7) $$s \approx \frac{mV}{f} \cdot \frac{(V-V_1)}{2}$$

or (8) $$\frac{2f}{m} \approx \frac{1}{s} \cdot V \cdot (V-V_1)$$

Hence, to a degree of approximation sufficient for practical purposes the threshold distance $(s)$ at which the brakes should begin slowing the first vehicle to prevent a collision, is proportional to the product of the absolute speed of the first vehicle and the speed of approach (or relative speed) between the first vehicle and the second vehicle. This may be expressed as follows:

(9) $$\frac{f}{m} = \frac{1}{2s} \cdot V \cdot (V-V_1)$$

If the second vehicle is stationary, the speed of approach and absolute speed are the same for the first vehicle, and the distance $s(s_1)$ is proportional to the velocity $(V^2)$ of the first vehicle. Thus,

(10) $$\frac{f}{m} = \frac{V^2}{2s}$$

As above mentioned, the Equation 9 given above is recognized as being an approximation but one which is useful and the one which most nearly applies for emergency conditions. When the conditions are present which cause this equation to give the greatest error, there is no emergency; i. e., when the speeds of the two vehicles are substantially the same. Obviously, if two vehicles are traveling at a spaced distance at substantially the same speed, there is no danger, and no brake application should be made. These basic relationships, although an approximation, are useful in a practical way and have been employed in actual detecting apparatus of the present invention since the factors may be obtained from a single vehicle and may be used to give the desired control for that vehicle.

Therefore, the present invention contemplates the provision of apparatus to provide a control effect which will apply a braking force gradually varying from a zero value to a maximum value when the proper conditions exist. This apparatus must provide a control effect proportional to the proximity of an object represented by $$\left(\frac{1}{s}\right)$$

and to the velocity $(V)$ of the first vehicle and to the speed of approach of the first vehicle to the second vehicle represented by $(V-V_1)$ such that the brakes will be applied at a proper distance expressed as follows:

(11) $$s = KV(V-V_1)$$

In this equation, $(K)$ is a constant of proportionality and is adjusted to include all the factors of gain, efficiency and the like, involved in the entire organization.

Therefore, if a threshold or operating value $E_{Th.}$ is needed for the initial application of the braking force, the voltage developed by the organization corresponding to the threshold value Th. should be proportional to $$\left(\frac{1}{s}\right)$$

to $(V)$, and to $(V-V_1)$. Therefore,

(12) $$E_{Th.} = K \cdot \frac{1}{s} \cdot V \cdot (V-V_1)$$

This equation represents the factors employed by the different embodiments disclosed herein as constituting the present invention. Each of the different embodiments or modifications of the present invention produces the same threshold or control value $E_{Th.}$ for the electro-pneumatic valve EPV of Fig. 1. However, each different embodiment employs a different optical arrangement for obtaining the initial factor in the form of an electrical voltage. Since each initial value is in different terms, corresponding changes are required in the embodiment in order to provide the proper threshold voltage for the control of the electro-pneumatic valve EPV. In order to graphically illustrate the function and operation of each different form disclosed herein as embodying the invention, a block diagram with accompanying mathematical notations has been illustrated for each form. However, it should be understood that, although specific circuit elements have been shown as providing output factors in terms of the mathematical notations indicated, different specific circuit elements may be employed and still obtain practical operating results. Likewise, although rather precise mathematical terms have been indicated in the block diagrams as expressing the output values for the different circuit elements constituting the embodiments of the invention, it is to be understood that these circuit elements may within limits provide slightly different output values and still obtain a resulting threshold control value that will be effective in practice. The reason that this is true resides in the fact that adjustments may be made to obtain the desired threshold value although the various output values above and below such threshold value may not conform to the same over-all output characteristics.

Operation of Fig. 3

The general structural characteristics of the first form of the invention have been discussed above, and the detail circuits for the control unit CN have been shown in Fig. 3. However, it should be noted that the output voltages of the phototube for any particular condition of ambient light will be the same for all focused distances. In brief, the plurality of different lenses on the scanning disc provides that for any particular distance, the output $E_{pt}$ of the phototube 10 when an object is in focus for the lens for that distance will be the same as the output of the phototube for the other lenses for other distances when an object is in focus for those lenses. The control circuit organization is such that when an object is in focus for a particular lens for a particular distance the output $E_{pt}$ will be such as to cause the final output $E_{FINAL}$ of the organization to correspond to the operative threshold value $E_{Th.}$ for the electro-pneumatic valve EPV if the other factors are proper. On the other hand, when there is no object in focus for a particular lens, then the output $E_{pt}$ of the phototube is such that the resulting output $E_{FINAL}$ of the circuit organization will be below the critical threshold value ($E_{Th.}$) required for operation of the electro-pneumatic valve EPV regardless of the other factors involved.

Let us assume that there is an object at a particular distance away from the optical pick-up so that it is in the point of focus of one of the lenses on the scanning disc for the corresponding distance. The phototubes thus have an output voltage which may be designated $E_{pt}$. Because the image is scanned as the lens on the scanning disc 7 rotates, this voltage $E_{pt}$ varies in amplitude with a rapidity and to a degree dependent upon the degree of contrast or rate of change of the illumination from point-to-point on the image. Obviously, the greatest rate of change in light will occur when the object is exactly in focus. Since the scanning rate is constant, the fluctuations in $E_{pt}$ represent the rate of change of light with respect to time. This may be expressed $$\frac{dL}{dt} \alpha$$

contrast where L represents the input light to the phototube. Hence, assuming the output of the phototube to be substantially linear, then $$\frac{dL}{dt} = \frac{dE_{pt}}{dt}$$

When this derivative is greater than a predetermined value, it represents the existence of an object in focus. For this reason, the output $E_{pt}$ of the phototube is passed through the differentiating condenser 54 and resistor 61 combination to produce a voltage $$\frac{dE_{pt}}{dt} \cdot K_1$$

where $K_1$ is the factor of efficiency of the differentiating elements. For convenience in the equations of Fig. 7, this differentiated output is represented by the term $E_1$ which is the input voltage to the tube 1T.

The amplifier unit including the tube 1T has an amplification factor which is proportional to $\Delta(+E_c)$, i. e. directly proportional to the control voltage. Since the bias supplied to the tube 1T is varied according to $$\frac{1}{s}$$

in synchronism with the shift from one focal length lens to another, the gain of the amplifier may thus be said to be proportional to $$\frac{1}{s}$$

i. e., proportional to the reciprocal of the distance that the object is away from the optical pick-up. Thus, the alternating current output of the amplifier tube 1T may be said to be equal to $$\frac{E_1 A_1}{s}$$

In this equation $A_1$ represents the amplification factor for the quiescent condition of tube 1T. Similar representations are used in connection with the other tubes. This alternating current output is passed through condenser 55 and supplied as a bias to the amplifier tube 2T by passing it through a rectifier filter combination including rectifier 56, resistor 62, and filter condenser 63. The output of this rectifier combination is a slowly varying direct current voltage equal to $$\frac{E_1 K_2 A_1}{s}$$

Since this voltage is applied as a bias, and output coupling condenser 65 is small, there would be no alternating current output of the tube 2T; but an alternating current generator GEN provides a small alternating current signal inductively coupled through a transformer 64 to the control grid circuit of tube 2T. This alternating current generator GEN is operated at a speed proportional to the velocity (V) of the vehicle and is so constructed that its output voltage is therefore proportional to said velocity (V).

The amplifier tube 2T is also selected so as to have an amplifying factor proportional to $$\frac{1}{\Delta(-E_c)}$$

i. e., inversely proportional to the control voltage. With this organization, the amplifier 2T provides an alternating current output equal to $$\frac{A_2 s V}{A_1 K_1 K_2}$$

This alternating current output is supplied through a relatively small coupling condenser 65 to the input of the amplifier tube 3T, which tube 3T is provided with a cathode bias. This amplifier 3T has an amplifying factor proportional to $\Delta(+E_c)$. In other words, the cathode bias determines the normal level of the control grid and the output of the amplifier tube 2T is supplied as a signal voltage to the control grid of this tube 3T. In addition, another bias voltage is supplied by the output from the tube 1T being passed through a rectifier and differentiating circuit element. More specifically, the output from tube 1T is passed through condenser 66, rectifier 67 and resistor 68 to ground. The condenser 69 is employed to filter any rapid variations due to scanning from the slowly varying direct current component. The resulting slowly varying direct current output may then be said to be equal to $$\frac{-E_1 K_3 A_1}{s}$$

This slowly varying direct current is then applied through the condenser 70 across resistor 71 to effect a differentiation of the changing direct current which may be represented by $$\frac{E_1 K_3 A_1}{s^2} \cdot \frac{ds}{dt} = \frac{E_1 K_3 A_1}{s^2} \cdot (V - V_1)$$

This voltage is then passed through the load resistor 72 to provide a variable bias to the grid of tube 3T.

Since these two quantities are supplied as an input to the amplifier tube 3T they are in effect multiplied so that the output of the amplifier 3T is an alternating current quantity equal to $$\frac{A_2 s V A_3 K_1 K_4 A_1 (V - V_1)}{A_1 K_1 K_2 s^2}$$

This alternating current output of tube 3T is passed through relatively small coupling condenser 58, rectifier 59 and resistor 73 to ground. A filter condenser 74 is also provided across the resistor 73. The output of tube 3T thus provides a bias voltage across resistor 73 proportional to such output. This bias voltage is applied to the direct current amplifying tube 4T which has a gain factor ($A_4$). The output of tube 4T may thus be said to be equal to the output of tube 3T multiplied by the factor ($A_4$).

Since the resultant of all of the various constants and amplifying factors may be said to be equal to the factor (K), then the output $E_{FINAL}$ of tube 4T may be said to be the final output of the system applied to the valve EPV. Since the initial operating value $E_{EPV}$ required for the value EPV is identical with the so-called threshold value $E_{Th.}$ when the application of the brakes is initiated, it will be easily understood that when the output $E_{FINAL} = E_{EPV}$, then it is actually equal to the critical threshold value of $E_{Th.}$ found in Equation 12. This particular operating threshold value $E_{Th.}$ is of course obtained when $E_{FINAL}$, the differentiated output of the scanning organization including the photo tube multiplied by the factors of proximity, speed of the vehicle and speed of approach, is equal to a certain value; but when this output $E_{FINAL}$ is smaller than this certain value, the electro-pneumatic valve is not operated. On the other hand, when the output $E_{FINAL}$ is greater than this certain value, the valve EPV is operated. The extent to which such output $E_{FINAL}$ is greater than the operating threshold value $E_{Th.}$ determines the added degree to which the EPV valve is energized and thus determines the rate at which the brake valve is actuated. This result is obvious from the equation because when the distance is short the output will be greater and thus cause greater energization of the EPV valve and apply the brakes more rapidly. The same is true when the velocity of the vehicle is greater; and the same is true when the vehicle is approaching the object at a more rapid rate.

In order to render the features of the present invention more clear, the operation above described will now be given in general terms of accomplished functions without reference to the mathematical relationships expressed above. Referring to Fig. 1, the lens 5 provides for focusing objects at different distances at points along its axis which is proportional to the distance the object is away. By way of example, the points 11, 12 and 13 have been illustrated by arrows. The disc 7 has lenses which will focus to these different distances. Obviously, these lenses do not cover all the points where images would be in focus by the lens 5, but the lenses of Fig. 2 have different focal points which pick up the images such as at the points 11, 12 and 13. Additional lenses could be used if desired. This means that when an object is a particular distance away from the lens 5, it is focused, let us say, at the point of image 11. This point coincides with the focal point of one of the lenses of scanning disc 7. When the scanning disc 7 rotates, different points across the image are brought in focus with the photoelectric cell 10 and because the image has different densities of light, there is a variation in the amount of light that is supplied to phototube 10 as this particular lens passes through the scanned image field for the object then focused by lens 5. This variation in the light of the image field causes variations in the output of tube 10. The present system as disclosed in Figs. 1, 2 and 3 with the explanatory mathematical expressions in the diagram of Fig. 7 requires more than this simple set of conditions.

More specifically, voltages proportional to the distance, and its derivative, the approach or differential speed, or relative speed, are produced by the amplifier 1T in Fig. 3, whose gain is varied in an increasing direction as the succession of focal planes (11, 12 and 13 in Fig. 1) are scanned by lenses D, M, C and RC (distant, medium, close and real close), so that when an object appears in the distance, its image is in plane 11, and it is scanned by all lenses, but only lens D has the proper focal length to project sharp changes in light on the phototube 10 as the lenses move through the field of the scanned image. These changes in light through the pinhole to the phototube causes extreme light fluctuations and hence large A. C. output. The other lenses produce only blurred images and small light changes through the opening to the phototube 10 and hence practically D. C. output. When lens D is in position, the bias control slider 51 of potentiometer 52 is positioned by crank 60 on shaft 16 (the same as shaft 16 in Fig. 1), to produce low gain in amplifier tube 1T of the voltage produced by a distant object. As the object moves to the medium distant position, its image goes through a transition condition when it is out of focus for all lenses. This is unavoidable, but can be minimized by breaking up the distance into a larger number of sections of shorter length (and hence, more focal planes and more lenses) so that the resulting effect at the phototube is smoother, by making successive images appear to overlap.

When the object reaches the medium distant position, its image appears at 13, Fig. 1, and lens M focuses its secondary image on the pinhole. When lens M is upright in position to admit light to the pinhole, the slider 51 is set to give tube 1T a bias for medium gain, hence the output of the voltage produced by a medium distant object is greater than when the object was more distant. Similarly, when the object is close, lens C focuses its primary image in 12 to produce a sharp secondary image at the pinhole, and slider 51 is set to give tube 1T a bias for high gain. Thus, the electrical output of the phototube 10 is higher for shorter distances, and gives a voltage inversely proportion to distance, or proximity, or closeness. While the contributions of the other lenses also reach the phototube, they are not characterized by the fluctuations produced by the lens that gives a sharp focus, i. e., their outputs (via phototube) more nearly resemble D. C. and cannot pass through condenser 54. The A. C. fluctuations of the phototube output when a sharp image is scanned by the proper rotating lens past its pinhole, can pass through condenser 54, and are amplified by the particular gain assigned to that lens by linkage 16, 60, 51 and 52. Hence there is an A. C. output of tube 1T proportional to closeness of the object.

If this object remains at the same distance, as a moving car can, the A. C. output of tube 1T stays constant. If the distance decreases, the A. C. output of tube 1T increases. If the distance decreases slowly, the A. C. output of tube 1T decreases slowly; and vice versa, if the distance decreases rapidly, the A. C. output of 1T increases rapidly. In other words, a slow increase of alternating current output amplitude of tube 1T represents a low speed of approach, while a fast increase of alternating current output amplitude of tube 1T represents a high speed of approach.

A circuit which will sense the difference between a slow rate of increase and a fast rate of increase is a differentiator but it must have essentially direct current to work on. The electrical output of the differentiator is zero for a constant electrical output of tube 1T; is low for a slow rise of electrical output of tube 1T; but is high for a rapid rate of rise of output of tube 1T. Thus, the differentiator's output directly represents speed of approach. Such a differentiating circuit is shown in its simplest form as including elements 70 and 71, where the rectified and smoothed output of tube 1T is applied to the condenser 70, causing a charging current to flow through resistor 71 and develop a voltage drop across it. If the output of tube 1T is constant, the charge on 70 is constant and no current flows through 71. If the voltage output of tube 1T is increasing, the charge on 70 changes, and current flows through 71, causing a voltage drop which is applied to the control grid of tube 3T, increasing its gain. Thus, an effect on the final control voltage developed by the chain of tubes is produced which is proportional to the speed of approach, or relative speed, or differential speed.

Through a similar rectifier and smoothing circuit, the A. C. output of tube 1T, representing closeness, is applied as D. C. bias to the tube 2T, increasing its gain with increasing closeness. Thus an effect is obtained proportional to closeness.

Both of these indications are produced in the scanner-controlled amplifier and associated circuits, not in the optical system, which only gives an A. C. output which is maximum for sharp focus and represents only the presence of an image. The synchronizing of gain levels of tube 1T with a selection of scanning lens and hence of focal planes, serves to identify the object distance, with a particular gain level. Long distance—low gain of tube 2T; short distance—high gain of tube 2T. No object (indefinite distance)—no sharp focus, no signal to tube 1T. Quick change from long distance to short distance (high speed of approach)—high gain of tube 3T. Slow change from long distance to short distance (low speed of approach)—low gain of tube 3T. No change of distance (zero speed of approach)—zero gain of tube 3T.

Hence, tube 1T gives A. C. output representing presence of object, with its gain proportional to object closeness. Tube 2T has A. C. input proportional to speed of approach obtained from GEN controlled by current through 71, with its gain controlled by rectified output of tube 1T. Tube 3T has A. C. input supplied to it by tube 2T, with its gain also controlled by speed of approach. Hence, A. C. output of tube 3T contains factors of all three conditions; i. e., presence of object in field of view of optical finder, its closeness, and the square of the speed with which it is being overtaken.

In the above organization, it is necessary to have the reactance of condenser 54 at the frequencies encountered very high compared with the associated series resistance which consists of resistor 61 and the internal resistance of the phototubes. Since the latter are usually very high resistance, it may be desirable in practice to isolate the phototube resistance by using an intervening cathode follower stage. The same consideration applies to the input of the differentiating condenser 70.

Also, it should be understood that any number of amplification stages can be used instead of the single stage shown.

*Modification of Fig. 4*

Referring to Fig. 4, it will be noted that there is a single objective lens 101 which focuses the image of an object at the shortest operating distance on the plane of the scanning disc 102 which is located between the objective lens and the aperture 103 leading to the phototube 104. Between the aperture 103 and the objective lens 101 is a scanning disc 102 which has a plurality of formed openings 105 so shaped and constructed as to cause the different degrees of contrast across the line of scanning to vary the amount of light which falls on the phototube.

It should be noted that the scanning disc 102 is rotated at a constant speed. The variations of illumination on the phototube 104 will be more extreme and more rapid with better focus. In other words, an object which is at a distance beyond the above mentioned minimum distance will have an image imperfectly focused on the plane of the scanning disc and hence will be somewhat fuzzy. For this reason the scanning of that imperfect image or field does not make abrupt or rapid changes; whereas, as the object becomes closer and more nearly in focus, the image becomes sharper and for this reason the degree of light on the phototube changes more abruptly. It is assumed that the optimum focus on the plane of the scanning disc occurs at the shortest feasible distance that an object may be in advance of the vehicle, for example, ten feet.

In other words, the sharper focus resulting from the object coming closer to the vehicle causes greater contrast in the image field scanned by the moving aperture in the scanning disc. For the purpose of this disclosure, it may be said that the contrast is the rate of change of illumination with respect to distance across the image. Consequently, the light passing through this moving aperture in the scanning disc and falling on the photo-tube varies more rapidly and through a greater range of intensity with closer proximity of the object up to the minimum distance.

The degree of contrast in the plane of the scanning disc increases with closer proximity of an object down to the closest range. Since the scanning rate is constant, the rate of change of illumination (L) on the photo-tube with respect to increments of time ($t$) is proportional to the degree of contrast. Therefore, this rate of change of illumination (L) on the photo-tube with respect to time represents the proximity of the object. These factors may thus be expressed mathematically in the differential equation where:

$$\frac{dL}{dt} \approx \frac{1}{s}$$

In this equation ($s$) equals distance; $1/s$ equals proximity. Since the apparatus employs electrical voltages then all that is necessary is to ascertain if the electrical voltages can be properly substituted in the above equation. The electrical output voltage of the photo-tube expressed as ($E_{pt}$), is proportional to the degree of illumination (L). Therefore, we can substitute ($E_{pt}$) for (L) in the above equation.

Therefore, $$\frac{dE_{pt}}{dt} \cdot K_1 \approx \frac{K_1}{s} = \frac{E_1}{s}$$

In this equation, $K_1$ equals a constant of proportionality representing the efficiency of the optical system, phototubes and differentiator. But for the sake of consistency with the prior form, this factor $K_1$ has been shown as equal to $E_1$.

Thus, it can be seen that the electrical fluctuations of the photo-tube output vary in amplitude and rapidity depending on proximity of the object. But to produce electrically an output equivalent to $$\frac{1}{s} \cdot E_1$$

requires differentiation of the output voltage of the photo-tube represented by $E_{pt}$ and this is effected by the circuit elements 106 and 107. The condenser 106 and resistor 107 have the same relationships as the differentiating condenser 54 and resistor 61 of Fig. 3. Also, it may be desirable to use a cathode following buffer stage for the input to condenser 106. The photo-tube 18 serves to compensate for ambient light as explained in connection with Fig. 3.

The output voltage across resistor 107 requires amplification to a useable level. However, the other factors of the equation must be obtained from this output. This is done by using one amplifier tube 5T which has a fixed gain represented by $A_1$. Thus, the alternating current output of tube 5T is equal to $$\frac{A_1 E_1}{s}$$

at the point $a$ which is the equivalent output appearing at point $a$ in Fig. 3. For this reason, the form of Fig. 4 may be considered as including all the apparatus of Fig. 3 beyond the point $a$. The block diagram of Fig. 8 also bears the same relationship to the block diagram of Fig. 7.

*Modification of Figs. 5 and 6*

Figure 5A:
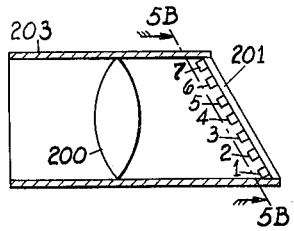
Figs. 5A and 5B illustrate structural details of a static scanner used in the circuit organization of Fig. 6.

With reference to Fig. 5A of the drawings, it will be noted that a single objective lens 200 focuses images on different planes of a grid 201 depending upon the distance of the image from the lens. The grid 201 comprises a plurality of light sensitive elements or strips of light sensitive material located parallel to each other but electrically insulated from each other. This grid 201 with its light sensitive bars 1, 2, 3, 4, 5, 6 and 7 is located on such an angle that the light sensitive bar 1 is on a plane in which objects at the closest distance are focused while the bar 7 is located on that plane in which the most distant objects are focused. The remaining intermediate bars of light sensitive material are of course located on planes in which objects are focused in intermediate distances. In this way an object at any given distance is focused on the plane in which the particular light sensitive strip for that distance is located.

Figure 5B:
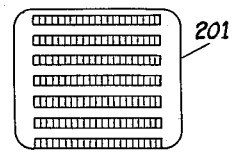

The grid 201 is shown in a plan view in Fig. 5B. This grid 201 is of course included in a suitable housing with a hood 203. This Fig. 5B shows that the light sensitive bars are made up like a pile to give the output from end-to-end, which output is non-linear with respect to illumination.

With reference to Fig. 6, the various light sensitive strips or bars of the grid 201 are shown diagrammatically in the circuit arrangement in which they are employed. These electrical connections are such that the various strips or bars are all connected in series between the control grid of a tube 6T and ground. A suitable alternating current is supplied from a generator through resistor 204 so that the voltage drop between the control grid and ground will vary in accordance with the resistance values of the series of light sensitive strips. The resistance of each light sensitive strip is lowest when it is completely illuminated, but when some portion is darkened the resistance of that strip is increased. If such darkened portion is completely dark, then the resistance of the strip is nearly as high as if the complete strip were in darkness. For this reason, it can be seen that an object having light and dark areas is most effective to increase the resistance of a light sensitive strip when such object is in focus for that strip.

The various strips 1, 2, 3, etc. are shown in Fig. 6 as having their respective multiple resistors 1a, 2a, 3a, etc. These resistors are of the variable type and are set with progressively decreasing resistances beginning with 1a in accordance with the increasing ranges of focus for successive light sensitive strips. Since the resistors respectively in multiple with the light sensitive strips are of a value selected for the distance for which that strip is in focus with a distant object, it can be seen that any given object is effective to determine the resultant resistance of the series combination dependent upon the distance that object is from the lens. In this connection, the resistor 1a is the highest resistor and the resistor 7a is the lowest; and the other resistors for the intermediate steps are of intermediate values. Also the light sensitive strip 1 is in focus for an object at the closest feasible distance, whereas the light sensitive strip 7 is in focus for the most distant feasible distance. For this reason, an object in focus for the shortest distance causes the greatest change in the total resistance of the series combination; whereas an object in focus for some greater distance causes a lesser change in the total resistance of the series combination.

In brief, the variable resistors have such selected values that the voltage drop across each light sensitive strip is inversely proportional to the distance for which that strip is in focus. For that reason, it can be said that the output of the scanning grid 201 appearing as current through resistor 204 can be expressed by the following equation:

$$E_{ss} \approx \frac{K_1}{s} = \frac{E_1}{s}$$

In this equation $K_1$ represents a constant of proportionality with respect to the light sensitive scanning grid, and $s$ represents the distance of the focused object, and again for the sake of consistency with the prior forms, this factor $K_1$ has been shown as equal to $E_1$. When this output is supplied to the amplifying tube 6T which has an effective constant amplification factor equal to $A_1$, the slowly varying direct current output of the amplifying tube 6T is equal to $$\frac{A_1 E_1}{s}$$

This is shown in the diagram of Fig. 9 in block form. This equation corresponds to the output of the amplifying tube 1T in Fig. 3 as can be seen from the block diagram of Fig. 7. For this reason it will be apparent that the output of the tube 6T can be connected to the circuit organization shown in Fig. 3 at the point $a$ of Fig. 3 in place of the scanning equipment shown therein together with the tube 1T and related apparatus. The functioning of the remainder of the modification will be exactly the same as shown in Fig. 3 and for this reason will not be discussed in detail. It is believed sufficient to state that this form of the invention obviously has the advantage that no moving parts are required in effecting the scanning operation. In effect, it may be said that a plurality of distances are scanned simultaneously.

Summary

In the above consideration of the operation of the several forms, the output of the phototubes is treated as a transient phenomenon using conventional transient analysis theory; whereas the output from these tubes may be considered as a mixture of sine waves and can be treated by appropriating sine wave analysis theory. From this standpoint differentiating circuits become filters and can be replaced by any of the conventional types of high-pass or band-pass filters.

It should also be understood that the various differentiating elements in the circuits have been shown in their simplest forms, but any suitable differentiating means may be employed. Also, when differentiating circuits are employed it is sometimes desirable to employ cathode follower stages between such differentiator and the next successive amplifier so as to obtain more perfect differentiation. Such refinements have not been shown in the disclosure since they are well understood in the art, and may be added to the circuits of the present disclosure without changing the novel relationships involved in the present invention.

Referring to Fig. 6, it should be understood that the resistor 204 may be replaced by a photosensitive element to compensate for ambient light changes in a similar manner as shown and described for the photosensitive element 18 of Fig. 3.

The contact 23 of Figs. 1 and 3 is to be suitably controlled by the steering apparatus so as to open when the vehicle is controlled more than a predetermined number of degrees off its normal or straight course. For example, the number of degrees selected may be in the range of 5 to 10 degrees. This contact 23 is also preferably provided with manual control so that the operator of the vehicle can restrain the system at will from the automatic application of the brakes.

In some cases it may be desirable to employ some form of warning device in addition to or in place of the automatic brake control. This feature has been shown by the lamp 27 being connected in multiple with the valve EPV. The intensity of the lamp illumination will give an indication of the intensity of the brake control degree of energization. If it is desired to have the lamp 27 just give an on and off indication, it can be controlled through contacts of a relay connected in multiple with EPV, or in place of such valve EPV, but which relay should have the same operating characteristics as the valve EPV.

It should be understood that the depth of focus of the optical system is kept as small as possible except for the form of Fig. 3 where sufficient depth of focus is desired to compensate for the steps between successive scanning lenses. For this reason, no iris or diaphragm has been shown to control the amount of light entering the lens, but it should be understood that any of the usual expedients may be used to give the proper depth of focus and degree of light control.

Also, it should be appreciated that the hood may be of any suitable length and shape so as to provide the proper pick up beam. This beam or path of pick up should be relatively narrow so as to be no broader than another vehicle at the maximum pick up distance, in the case of automobiles. This means that the objects picked up or checked by this system must be in the lane of traffic in which the car is moving. The beam is also raised a suitable distance above the surface of the road so as to give proper range. Although the range of detectable pick up will vary depending upon the efficiency of the optical system employed, it is contemplated that the range will be in the order of two hundred feet. This may be increased by improvement of available optical organizations.

One characteristic of this invention is that a distantly focused portion of the road or fence on a curve will remain at the same relative focused distance so that no speed of approach will be detected and hence no unnecessary operation of the brakes or warning signal. To state this fact another way, it will be appreciated that a vehicle travelling a uniform curve may have obstructions appear within the path of the vehicle a certain distance ahead because such path is tangent to the curve. But the vehicle never actually arrives at such obstructions because it follows the curve and not its tangent. For this reason, the objects, such as guard rails, which are focused at a distance, are not actually approached in the beam of the optical pick up, and there is no indicated speed of approach. This same reasoning applies to portions of the roadway that may come into the detecting beam by reason of hills and valleys.

A further consideration is that dark objects in focus will usually appear much darker than the dark objects of the background which are out of focus, while just the converse is true with respect to light objects. The latter is true because the close object in focus transmits more reflected light by reason of its distance from the optical pick up. In this connection, it should be appreciated that the compensating phototube is acted upon by the general background condition rather than by the particular objects in focus. The particular conditions affecting the compensating phototube can be regulated by varying the size of the aperture and any lens system used in connection with it.

Having thus shown several forms of a distance and speed responsive device or organization, it is to be understood that various modifications and adaptations may be employed in connection with the present disclosure without in any way departing from the scope of the contemplated invention.

What I claim is:

1. In a safety device of the character described for vehicles comprising in combination, an optical field of view ranging device including light responsive means having a scanning aperture and a photo-senstive image analyzing surface positioned in the optical image field, said photo-sensitive image analyzing surface giving an electrical output independent of variations in the amount of ambient light and dependent upon the position degree and gradient of the degree of contrast of the scanned optical images of objects in the field and indicating the presence of such objects therein, electrical analyzing and computing control means governed by said electrical output, and effective to convert it into a composite electrical quantity having an amplitude dependent upon the presence of said objects and upon the square of the speed of approach of the vehicle containing said device to said objects, and relative to the absolute distance to said objects, and automatic brake applying apparatus governed by said device and acting to apply brakes on said vehicle in accordance with the composite electrical quantity to a degree effective to reduce the speed of the vehicle sufficiently to prevent collision.

2. In an organization of the character described for detecting the distance and speed of approach of a vehicle to a distant object moving or fixed in any one of a plurality of optical fields preceding such vehicle, an optical device for focusing sharply the image of an object in at least one field at a given distance and less sharply the images of such other fields proportional to the distance in advance of said vehicle containing such device on an image focal plane, a light sensitive and image analyzing means including electrical circuits for detecting the degree of contrast of the image of said focused field and the time rate of change in the degree of contrast and for converting these quantities to an electrical output, and electrical circuit means governed by the electrical output of said light sensitive and analyzing means for converting said electrical output representing the existence of an image of said object its degree of contrast and its time rate of change of contrast into an electrical composite factor representing the square of the speed of approach of the vehicle to said object and also the distance to said object, and indicating and control means governed by said electrical circuit means and actuated by and in accordance with said electrical factor to reduce the speed of said vehicle sufficiently to prevent collision.

3. In a safety device for vehicles, an optical ranging device including a photo-electric cell, a first amplifier, circuit means connecting the output of said photo-electric cell to said first amplifier, optical means including a main lens for focusing images at different planes along an optical axis in accordance with the different distances to corresponding objects, a scanning means for supplying light bundles of intensities varying with the degree of contrast of a focused image to said photo-electric cell for several different image planes in succession at a predetermined rate, circuit means for changing the ratio of gain of said first amplifier to a different value during the scanning of the different image planes to cause said first amplifier to give an output having an amplitude characteristic of the distance to the object then being focused by said main lens, a second amplifier including differentiating circuit means responsive to the output of said first amplifier to give a distinctive output in accordance with the rate of change of the output of said first amplifier, and brake apparatus rendered effective for stopping said vehicle when the output of said second amplifier rises above a predetermined value.

4. In a safety device for vehicles, an optical ranging device including a main lens, a light responsive means for receiving light from said lens, a scanning device between said lens and said light responsive means and a first amplifier controlled by said light responsive means to give an output amplitude proportional to the distance to an object within the field of said lens, said output amplitude becoming greater as said object becomes closer, a second amplifier connected to the output of said first amplifier through differentiating circuit means, said second amplifier giving an output of an amplitude proportional to the rate of change in amplitude of the output of said first amplifier, brakes for said vehicle, a power source, and control means for at times applying power from said power source to said brakes to render them effective, said control means being rendered active when the output of said amplifier becomes greater than a predetermined value.

5. In a safety device for vehicles, an optical ranging device including a main lens, a photo-electric cell responsive to light focused by said main lens, and a first amplifier controlled by said photo-electric cell to give an output of an amplitude proportional to the distance to an object within the field of said main lens, said amplitude becoming greater as said object becomes closer, a second amplifier connected through differentiating circuit means to the output of said first amplifier to give an output of an amplitude dependent upon the rate of increase in the amplitude of the output of said first amplifier, a third amplifier connected through other differentiating circuit means to the output of said first amplifier to have its ratio of gain increased in accordance with the rate of increase of the amplitude of the output of said first amplifier, said third amplifier having its input coupled to the output of said second amplifier to provide an output dependent upon the square of the rate of approach to said object, brakes for said vehicle, a power source, and control means for applying power from said power source to said brakes to render them effective when said control means is rendered active, said control means being rendered active when the amplitude of the output of said third amplifier is above a predetermined value.

References Cited in the file of this patent
UNITED STATES PATENTS

| Number | Name | Date |
|---|---|---|
| 1,704,710 | Murray et al. | Mar. 12, 1929 |
| 2,016,036 | Fitzgerald | Oct. 1, 1935 |
| 2,188,293 | Williams | Jan. 23, 1940 |
| 2,216,575 | Seinfeld | Oct. 1, 1940 |
| 2,233,392 | Allen | Mar. 4, 1941 |
| 2,354,687 | Keith et al. | Aug. 1, 1944 |
| 2,412,822 | Malter | Dec. 17, 1946 |
| 2,468,042 | Cranberg | Apr. 26, 1949 |
| 2,524,807 | Kallmann | Oct. 10, 1950 |